June 10, 1941.    T. R. HARRISON    2,245,033
MEASURING APPARATUS
Filed Sept. 4, 1937    6 Sheets-Sheet 1

INVENTOR.
THOMAS R. HARRISON.
BY
ATTORNEY

June 10, 1941.  T. R. HARRISON  2,245,033
MEASURING APPARATUS
Filed Sept. 4, 1937  6 Sheets-Sheet 2

INVENTOR.
THOMAS R. HARRISON
BY C. B. Spangenburg
ATTORNEY

June 10, 1941.  T. R. HARRISON  2,245,033
MEASURING APPARATUS
Filed Sept. 4, 1937  6 Sheets-Sheet 4

FIG. 7.

INVENTOR.
THOMAS R. HARRISON.
BY George M. ...
ATTORNEY

June 10, 1941. T. R. HARRISON 2,245,033
MEASURING APPARATUS
Filed Sept. 4, 1937 6 Sheets-Sheet 5

INVENTOR.
THOMAS R. HARRISON
BY George N. Wurzelbaugh
ATTORNEY

Patented June 10, 1941

2,245,033

UNITED STATES PATENT OFFICE 2,245,033

MEASURING APPARATUS

Thomas R. Harrison, Wyncote, Pa., assignor to The Brown Instrument Company, Philadelphia, Pa., a corporation of Pennsylvania Application September 4, 1937, Serial No. 162,474

22 Claims. (Cl. 88—23)

The present invention relates to apparatus for ascertaining and continuously recording and/or controlling the magnitude of a variable condition, and more particularly the invention relates to self balancing measuring apparatus which is of special utility in recording and/or controlling temperature variations in incandescent bodies.

An object of the invention is to provide radiant-energy responsive apparatus for ascertaining and continuously recording temperature variations in incandescent bodies.

Another object of the invention is to provide apparatus of the type referred to above, which is characterized by being extremely fast in response and self balancing.

A special object of the invention is to provide high speed temperature measuring and recording apparatus in which a light sensitive device may be employed as the condition responsive element, and in which delicate electrical current measuring instruments, such, for example, as microammeters or milliammeters are not required nor employed.

In measuring and recording temperature variations in incandescent bodies it is relatively important in certain applications that the apparatus employed be capable of responding to and recording the variations in a minimum of time. For example, if an accurate record is desired of the variations in temperature throughout their length of successive pieces of material such as bars or billets passing in process through a steel mill, it is of especial importance that the measuring apparatus be capable of a high speed of response. The practicability of employing light sensitive devices or photoelectric cells in making such measurements is readily apparent, since, as is well known, photoelectric cells are characterized by their extreme rapidity of response to variations in light intensity and pass an electric current which bears a definite relation to the temperature of the body from which the light emanates.

Various high speed radiant energy responsive systems utilizing a light sensitive device as the condition-responsive element have heretofore been proposed for measuring and recording temperature variations in incandescent bodies, but all of the proposed systems have been of a deflectional type employing a delicate electrical current measuring instrument and a scale or chart with which the deflecting member or pointer of the instrument is adapted to cooperate. In the proposed systems the radiant light from an incandescent body is ordinarily directed on a photoelectric cell and the electric current passed by the cell is measured by a suitably calibrated electrical current measuring instrument. In some instances, the current passed by the photoelectric cell is first amplified by some form of electronic amplifier and the amplified quantity is measured by a similarly calibrated electrical current measuring instrument. As is apparent the position of the deflecting member or pointer of the instrument relative to the scale thereof will provide a measure of the temperature of the incandescent body, and, if a record is desired, suitable apparatus may be arranged in cooperative relation with the instrument pointer to periodically record its position on a chart or a pen may be mounted directly on the instrument pointer and arranged to cooperate with a chart to thereby provide a continuous record of the temperature variations. Since the only time lag in recording by the last mentioned method is that required for the instrument pointer to swing up scale, this method has proved to be the most desirable of the prior art devices adapted for utilizing to advantage the high speed of response of the light sensitive elements.

As is well known, however, deflectional measuring instruments are undesirable in many respects for making precision measurements. For example, the calibration of a deflectional measuring instrument is dependent upon the constancy of magnets, springs, jewel bearings, and the level of the instrument, all of which are affected and changed to varying extents by many factors such, for example, as temperature, age, and vibration. Such instruments, furthermore, are limited in respect to the available torque for recording or controlling purposes making necessary the use of narrow and therefore undesirable charts and unsatisfactory control instrumentalities. Such instruments, furthermore, embody charts having non-rectangular coordinates which are undesirable and ordinarily the periodicity of response necessarily employed results in sluggish response thereof to small departures.

The above objections have been avoided in the apparatus of my invention by providing a self balancing electrical bridge network especially adapted to be used with the radiant energy responsive apparatus for recording the measured variations in a minimum of time. In the preferred embodiment of my invention, a photoelectric cell, responsive to the radiant light emanating from an incandescent body whose temperature is to be measured, is employed to control the bridge network balance and a reversible electrical motor is arranged to be selectively controlled in response to bridge network unbalance so that the motor will remain stationary or will be energized for rotation in one direction or the other as the temperature of the incandescent body rises above or falls below a predetermined value. The motor shaft is preferably connected in any convenient manner to the bridge rebalancing contact so that energization of the motor is employed to effect movement of the rebalancing contact in the proper direction to rebalance the bridge network. As is apparent, the new position of the rebalancing contact will provide a measure of the temperature of the incandescent body and, if desired, a pen may be mounted on the carrier of the rebalancing contact and arranged to cooperate with a suitably calibrated record chart for recording the temperature variations.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Figs. 8–11 illustrate modifications of a portion of the arrangement of Fig. 7.

Figure 1:
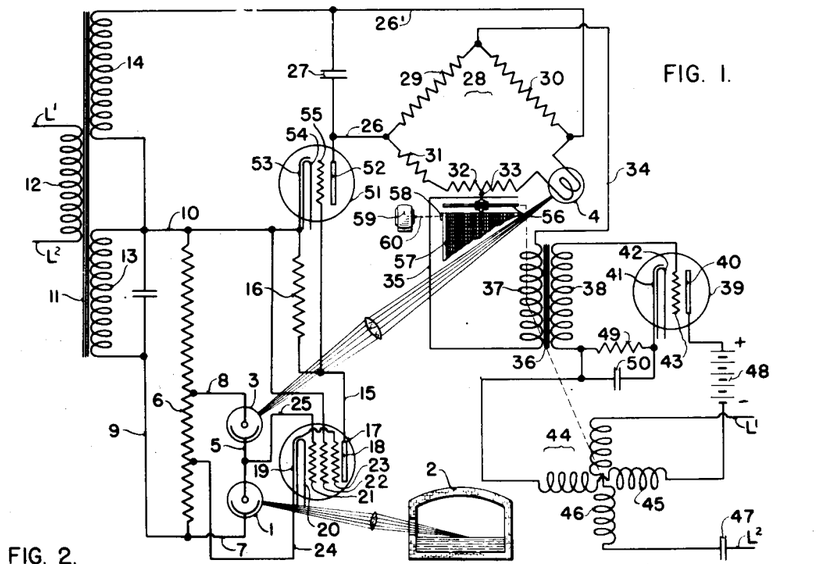
Fig. 1 is a diagrammatic view illustrating one embodiment of the invention as adapted for use in measuring and recording the temperature of an incandescent body.

In Fig. 1 of the drawings, a photoelectric pyrometer is illustrated in which a photoelectric cell 1 is arranged to receive light from the interior of a furnace 2, and a second photoelectric cell 3 is arranged to receive light from a lamp 4, the illumination of which is adapted to be controlled by means responsive to the relative illuminations of the two photoelectric cells. The photoelectric cells are arranged in an electrically balanced circuit, and, as the temperature of the incandescent material within the furnace varies, the illumination of lamp 4 is varied until the illumination on the two photoelectric cells is again balanced. As will be apparent, the magnitude of the lamp energizing current will then be a measure of the temperature of the incandescent material in the furnace 2.

As shown the two photoelectric units are connected in series relation by a conductor 5 and the series arrangement is connected across a suitable portion of a voltage divider 6 by conductors 7 and 8. The unit 1 is preferably so arranged that the only light which impinges on the unit is that which is to be measured. Desirably the unit 3 is also arranged so that it is subject only to light from the lamp 4.

The voltage divider 6 is connected by conductors 9 and 10 across the terminals of the secondary winding 13 of a transformer 11 which includes a line voltage primary winding 12 connected to the alternating current supply lines L¹ and L² and secondary windings 13 and 14. As shown the cathode of photoelectric cell 1 is connected to one end of the voltage divider 6 and the other end of the voltage divider is connected by a conductor 15 in which a resistor 16 is inserted, to the anode 18 of an electronic valve 17. The valve 17 is a heater type pentode and includes the anode 18, a cathode 19, a heater filament 20 which may be energized from a suitable alternating current or direct current source, as desired, a control grid 21, a screen grid 22 and a suppressor grid 23. The cathode 19 is connected by a conductor 24 to a point on the voltage divider between the points of connection of conductors 7 and 8 thereto, and the control grid 21 is connected by a conductor 25 to the conductor 5 between the two photoelectric cells. The screen grid 22, as shown, may be connected to a point on the voltage divider 6 which is at the same potential as the point of connection of conductor 15 thereto.

One end of the transformer secondary winding 14 is connected by the conductor 10, and a conductor 26, in the latter of which an electronic valve 51 is inserted, to one energizing terminal of a Wheatstone bridge 28 and the other end of the winding 14 is connected by a conductor 26¹ to the remaining bridge energizing terminal. As will be later described the valve 51 is adapted to control the flow of energizing current to the bridge network 28. This valve is adapted to conduct pulsating current only, however, and in order to smooth out this flow of pulsating current through the bridge network, a condenser 27 may desirably be connected across the bridge energizing terminals as shown.

The bridge network 28 includes fixed resistors 29 and 30 in two opposing arms, the lamp 4 and a resistor 31 in the two remaining arms. A slidewire resistor 32 is connected between the last mentioned arms and it will be noted more or less of the resistor 32 is adapted to be placed into or taken out of the bridge arms including resistor 31 and lamp 4 as a contact 33 is moved along the slidewire resistor. The equalizing or balancing terminals of the bridge 28 are connected by conductors 34 and 35 to the terminals of the primary winding 37 of a transformer 36, the secondary winding 38 of which is connected to the input circuit of an electronic valve 39. The electronic valve 39 is a heater type triode and includes an anode 40, a cathode 41, a heater filament 42, which may be energized from a suitable alternating current or direct current source, and a control grid 43. One winding 45 of a two-phase reversible electrical motor 44 is included in the output circuit of valve 39 and the other motor winding 46 is connected to the alternating current supply lines L¹ and L² through a suitable condenser 47.

As illustrated anode voltage is supplied to valve 39 from a battery 48, but it will be understood the output of a suitable rectifier energized from an alternating current source may be employed in lieu of battery 48, if desired. The current flow through the valve 39 is normally maintained at a mean value due to the action of a cathode biasing resistor 49 which, as shown, is shunted by a condenser 50. When the current flow through the bridge equalizing conductors 34 and 35 is zero in value, the pulsations in the current flow through the motor winding 45 will be negligible and incapable of energizing the motor for rotation. When the bridge 28 becomes unbalanced, however, alternating currents in phase with or 180° out of phase with the line current will flow in the bridge equalizing conductors 34 and 35 to thereby energize the transformer 36, and as a result pulsating direct current of corresponding phase will flow through the motor winding 45. Due to the action of condenser 47 the current flow through the motor winding 46 will lead the line current by approximately 90° so that when the winding 45 is so energized by pulsating direct currents in phase with or 180° out of phase with the line current, the magnetic fields set up by these windings will be displaced by approximately 90° with the result that a rotating magnetic field will be set up in the motor in one direction or the other and the motor rotor will accordingly be actuated for rotation in a corresponding direction. Thus, depending upon the direction of unbalance of the bridge 28, the motor will be energized for rotation in one direction or the other, and as will be apparent, the motor speed will be directly dependent upon the extent of bridge unbalance.

In operation the energizing current supplied to bridge 28 is adapted to be varied in accordance with the illumination of photoelectric cell 1 by an arrangement including the electronic valve 51 so that the intensity of illumination of lamp 4 will be varied in the proper direction to restore the balance of illumination of the two photoelectric cells. The electronic valve 51 is a heater type triode and includes an anode 52, a cathode 53, a heater filament 54 which may be energized from a suitable alternating current or direct current source, and a control grid 55. Anode voltage is supplied to valve 51 from the transformer secondary winding 14 and as shown the anode 52 is connected to one terminal of winding 14 through the bridge network 28 and cathode 53 is connected to the other terminal thereof. The anode circuit of valve 51 is thus seen to be connected in series circuit relation with the bridge 28 and the transformer secondary winding 14. As shown the cathode 53 is connected to the positive end of resistor 16 which is connected in the anode circuit of valve 17, and the grid 55 is connected to the negative end thereof.

When light from the interior of furnace 2 is focussed on the photoelectric cell 1, the electron emission from the cathode of this unit accordingly increases to thereby render the control grid 21 of valve 17 more negative relative to the cathode 19, resulting in a decrease in the current conducted by valve 17 and consequently in a decrease in the potential drop across resistor 16. Thereupon the grid 55 of valve 51 becomes less negative relative to the cathode 53, resulting in an increase in the current conducted by the valve 51 and thereby in an increase in the energizing current supplied to the bridge network 28. As lamp 4 subsequently brightens, the electron emission from the cathode of photoelectric cell 3 increases to render the control grid 21 of valve 17 less negative, and since valve 17 controls the potential of grid 55 of valve 51, the latter is accordingly rendered more negative. This action results in the establishment of a balanced condition of the illumination of the two photoelectric cells, and, as will be clear, the energy used by lamp 4 will then provide a measure of the intensity of the illumination on photoelectric cell 1.

When photoelectric cells of the vacuum type are employed, this balance of illumination will be exact to a relatively high degree of precision by virtue of the fact that when the voltage across the photoelectric cells is high enough to draw all of the electrons from the cathode to the anode the currents conducted by the photoelectric cells will be constant for all higher voltages. Accordingly only negligibly small unbalance of illumination will be sufficient to swing grid 21 of valve 17 to any degree of bias that may be necessary to restore the balance of illumination.

It will be apparent that when the energizing current supplied bridge 28 is varied, the current flow through the lamp 4 and thereby the illumination of the lamp is varied. It should be noted, however, that the voltage drops through the bridge arms 29, 30, and 31 bear a straight line relationship to the current flow therethrough, but that no such straight line relationship obtains for the lamp 4 for as the lamp current is increased the filament temperature is raised and because of the temperature coefficient of resistance possessed by the filament, the voltage drop thereacross increases at a different rate than does the current. For example, tungsten lamps have a positive temperature coefficient of resistance and carbon lamps have a negative temperature coefficient of resistance. Either type of lamp may be employed in the bridge 28, but I have found it desirable to use a carbon lamp. It will then be apparent that when the energizing current supplied to bridge 28 is changed, the bridge will be unbalanced in one direction or the other and to an extent corresponding with the magnitude of the change, and accordingly a pulsating electromotive force in phase with or 180° out of phase with the line voltage will appear across the equalizing terminals of the bridge. This pulsating voltage is impressed on the primary winding 37 of transformer 36, the secondary winding 38 of which is connected to the input circuit of valve 39 so that the latter is alternately rendered more conductive and less conductive at a frequency corresponding to the supply line frequency, and accordingly pulsating direct current in phase with or 180° out of phase with the line voltage will be impressed on the motor winding 45 resulting in selective energization of the motor for rotation in one direction or the other. Thus, depending on the change in value of light falling on photoelectric cell 1, the motor will be selectively energized for rotation in one direction or the other, and it is noted the motor speed will be directly dependent upon the extent of such change.

As shown in Fig. 1 the shaft of motor 44 is connected in any convenient manner to a shaft 56, which may desirably be a rod having a spiral groove thereon, and the bridge rebalancing contact 33 is mounted on a carriage carried by shaft 56 and is arranged to be moved in one direction or the other as the shaft 56 is rotated. Thus, when the motor 44 is energized for rotation as a result of a change in resistance of lamp 4, the motor effects an adjusting movement of the contact 33 along the slidewire resistor 32 in the proper direction to equalize the potential drops across the bridge arms including the lamp 4 and the resistor 31 to thereby rebalance the bridge. The bridge will then be rebalanced and the motor will come to rest with the contact 33 at a new position along the slidewire resistor 32, which position will be a measure of the value of the illumination on the photoelectric cell 1 and thereby of the temperature of the material in the furnace 2.

Desirably, a pen, mounted on the carriage which carries the bridge rebalancing contact 33, is arranged to cooperate with a recorder chart 57 and to thereby provide a continuous record of the temperature of the material in furnace 2. The recorder chart is arranged to be driven by a continuously rotating roller 58 and the latter is driven in any convenient manner, as, for example, by a unidirectional motor 59 through suitable gearing 60 so that a record of the temperature of the material in the furnace 2 will be had as a continuous line on the chart.

Figure 2:
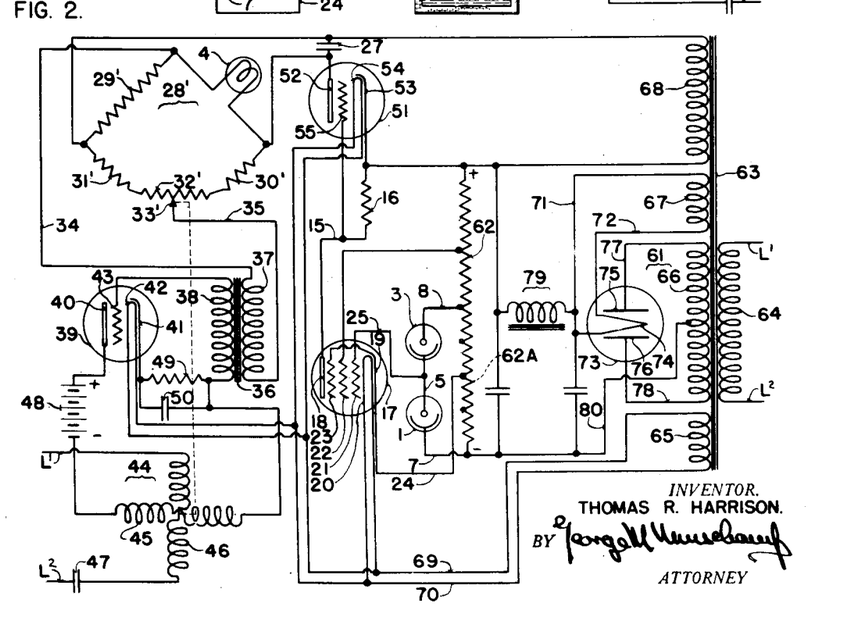
Figs. 2, 2A and 2B illustrate a modification of the arrangement disclosed in Fig. 1.
Figure 2:
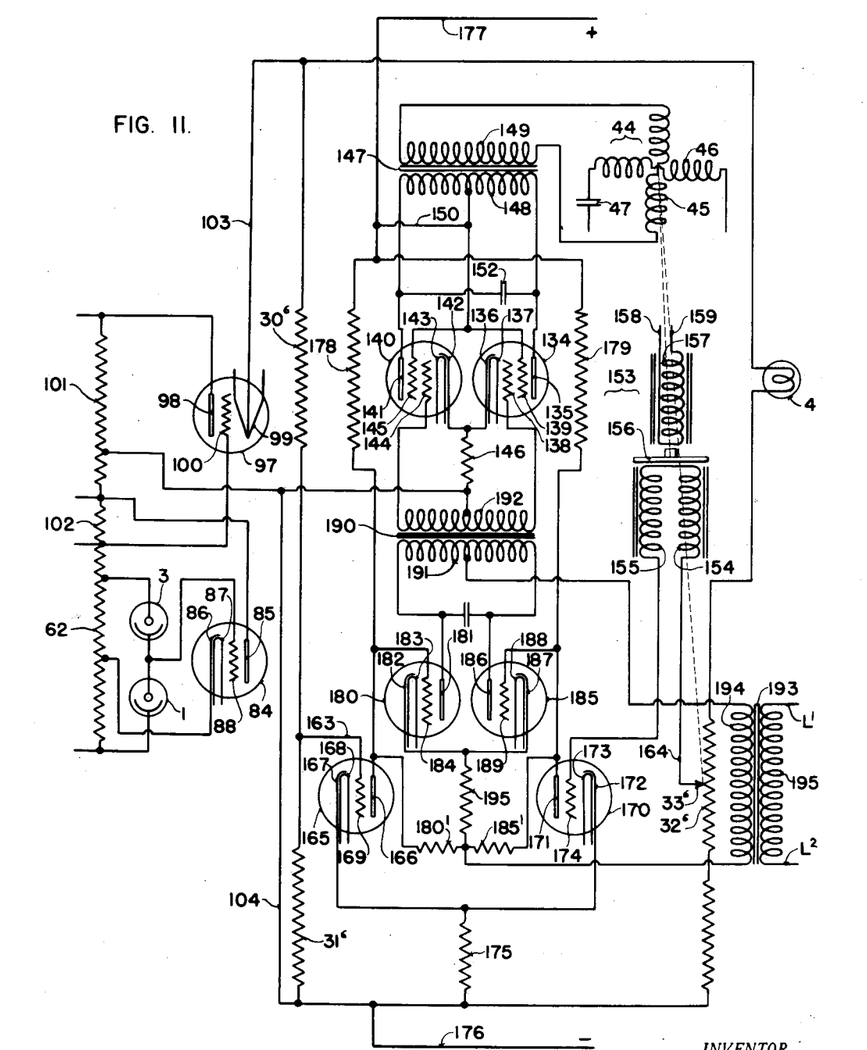

In Fig. 2 I have illustrated, more or less diagrammatically, a modification of the arrangement shown in Fig. 1 in which the photoelectric cells 1 and 3 and the electronic valve 17 are energized from a suitable direct current supply source, as provided by a rectifier network 61, for example, and the electronic valve 51 and a bridge network $28^1$ are energized from an alternating current supply source. As illustrated, the photoelectric cells 1 and 3 are connected in series relation by the conductor 5 and are connected across a suitable portion of a voltage divider 62 by the conductors 7 and 8. Photoelectric cell 1 in this arrangement is arranged to receive light from the interior of a furnace 2 as in the arrangement of Fig. 1 and similarly photoelectric cell 3 is arranged to receive light from the lamp 4. The cathode 19 of valve 17 is connected to the voltage divider at a point between the points of connection of conductors 7 and 8 thereto and the control grid 21 is connected by conductor 25 to the conductor 5 which connects the two photoelectric cells together. The screen grid 22 is connected to a point on the voltage divider which is positive with respect to the point of connection of the cathode 19 thereto and the anode 18 is connected to a point on the divider which is positive with respect to the point of connection of the screen grid 22.

The voltage divider 62 is energized from a transformer 63 which is a combination step up and step down transformer and comprises a line voltage primary winding 64 connected to the supply lines $L^1$ and $L^2$ and secondary windings 65, 66, 67, and 68. The secondary winding 65 is connected by conductors 69 and 70 to the heater filaments of valves 17, 39, and 51 and supplies these filaments with energizing current, and the secondary winding 67 is connected by conductors 71 and 72 to the heater filament or cathode 74 of a valve 73 and supplies energizing current thereto. The valve 73, as shown, is a conventional full wave rectifier valve and is employed to maintain a direct current potential across the voltage divider 62. The anode plates 75 and 76 are connected by conductors 77 and 78 with the terminals of the secondary winding 66 and the rectified current is connected to the terminals of a filter 79. A center tap on the secondary winding 66 is connected by a conductor 80 to one terminal of the filter 79 and the other terminal of the latter is connected to the filament cathode 74. The terminals of the filter are connected to opposite ends of the voltage divider 62 so that a steady direct current voltage is maintained across the divider which, due to the filtering action of the filter, is substantially free from alternating components.

The bridge network $28^1$ may be similar to the bridge network 28 of the Fig. 1 arrangement, if desired, but in this modification it will be noted that the lamp 4 alone comprises one arm, resistors $29^1$, $30^1$ and $31^1$ each are included in a remaining arm, and a slidewire resistor $32^1$ is connected between the last two mentioned resistors. A bridge rebalancing contact $33^1$ is provided for restoring the bridge balance upon unbalance of the latter, and, as shown, is adapted to be moved along the slidewire resistor $32^1$ for varying the potential drop across the arm including resistor $30^1$ as the resistance of lamp 4 varies.

When light from the interior of furnace 2 is focussed on the photoelectric cell 1, this unit accordingly conducts more current and thereby renders the potential of the control grid 21 of valve 17 more negative with respect to the cathode 19, resulting in a decrease in the current conducted by the valve and consequently in a decrease in the potential drop across resistor 16 connected in the anode circuit thereof. The control grid 55 of valve 51 will then become less negative with respect to the cathode 53 and as a result increased pulsating current will flow in the anode circuit of this valve and thereby through the bridge network $28^1$. The illumination of lamp 4 is thus varied in the proper direction by an amount sufficient to restore the balance of illumination of the two photoelectric cells. The increased current flow through the lamp 4 results in a change in the resistance of this unit as explained in connection with the arrangement of Fig. 1 and thereby in unbalance of the bridge $28^1$ so that an alternating current of corresponding phase will flow in the equalizing conductors 34 and 35. This alternating current is amplified by the transformer 36 and valve 39 and the amplified current is impressed on the phase winding 45 of motor 44 for causing selective energization of the motor. The motor phase windings are so arranged in relation to the remainder of the circuit that the resulting rotation of the motor will be in the proper direction to adjust the contact $33^1$ in the proper direction to rebalance the bridge. The motor energizing current will thus be reduced to zero and subsequently the motor will come to rest. The new position of the contact $33^1$ along the resistor $32^1$ will then provide a measure of the illumination on the photoelectric cell 1 and thereby of the temperature of the furnace 2.

Figure 2A:
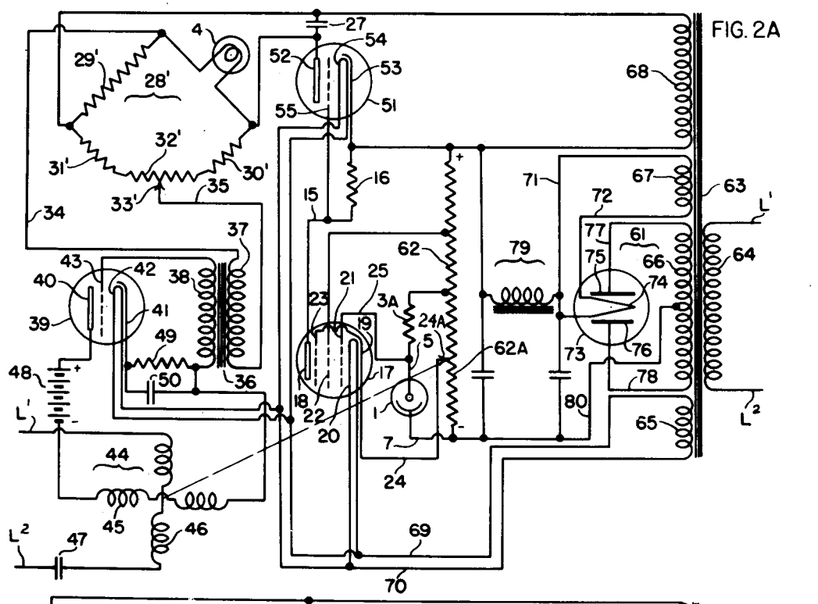

As will be readily apparent to those skilled in the art, the photoelectric cell 3 may be replaced by a resistor 3A as indicated in Fig. 2A and the point of engagement of conductor 24 with the voltage divider 62 may be made adjustable and movable relatively thereto for rebalancing purposes in lieu of rebalancing by movement of the contact $33^1$ relatively to the resistor $32^1$. With this alternative arrangement the contact $33^1$ may desirably be fixed at an intermediate position along the resistor $32^1$ and the contact 24A may be moved relatively to the voltage divider 62 by the motor 44.

By proper adjustment of contact $33^1$ along resistor $32^1$ it will be apparent for each value of illumination on the photoelectric cell 1 there will be a corresponding position of the contact 24A along the divider 62 at which the potential of the control grid 21 of valve 17 relatively to the cathode 19 will be that required to maintain the supply of energizing current to the bridge network $28^1$ constant and at the value at which the bridge unbalanced voltage in the equalizing conductors 34 and 35 will be zero.

Upon departure in the illumination on photoelectric cell 1 from a balanced condition, for example, upon an increase in the illumination, the potential on the control grid 21 will be made less positive relatively to the cathode 19 and as a result the conductivity of valve 17 will be decreased and the potential drop across resistor 18 will be reduced. Such reduction in the potential drop across resistor 18 results in the potential of the control grid 55 of valve 51 being made less negative with respect to the cathode 53 resulting in increased conductivity of the valve and consequently in an increase in the supply of pulsating energizing current to the bridge network 28$^1$. This increase in energizing current causes an unbalanced alternating voltage to appear in the equalizing conductors 34 and 35 as hereinbefore explained, which unbalanced voltage is amplified by the transformer 36 and valve 39 and applied to one phase winding of motor 44. The motor windings are so connected in circuit that the resulting rotation of the motor will be in the proper direction to adjust the contact 24A in a downward direction to restore the normal, balanced potential relation of the control grid 21 and cathode 19 of valve 17. The motor energizing current will then be reduced to zero and subsequently the motor will come to rest.

It will be apparent a chart 57 may be arranged in cooperative relation with the voltage divider 62 and a pen may be mounted on the carriage which carries the rebalancing contact 24A for recording the variations in illumination on the photoelectric cell 1. It is noted that in order for the pen to travel the entire width of the chart, the pen should be able to reach the edges of the chart without embracing the entire section of the voltage divider 62 between the conductors 7 and 8. This end may conveniently be attained in practice by inserting a resistor 62A of suitable value in series with the section of the voltage divider 62 between the conductors 7 and 8, as illustrated.

Figure 2B:
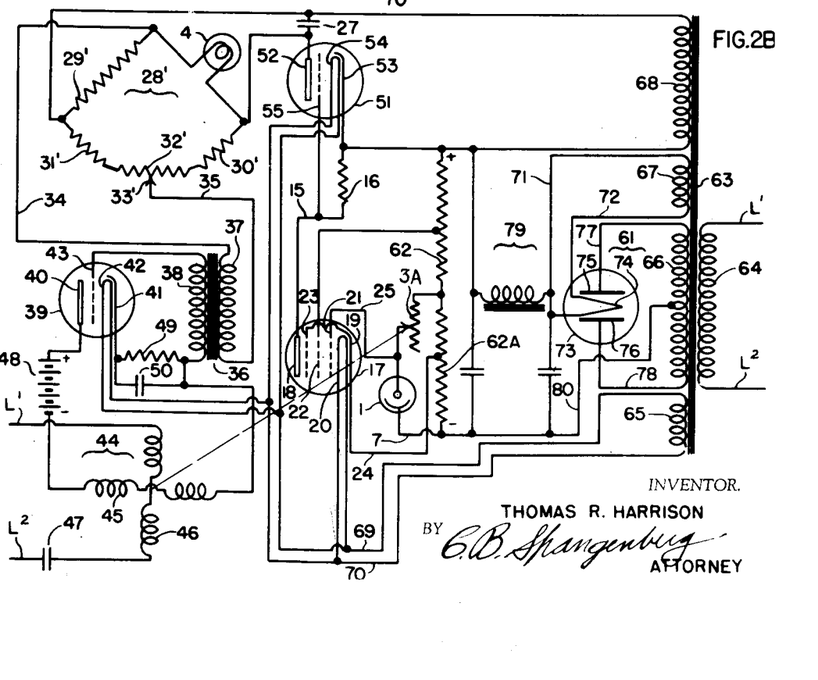

As another alternative arrangement of the Fig. 2 disclosure, it is noted that the photoelectric cell 3 may be replaced by a resistor 3A and the point of engagement between the conductor 25 and the resistor 3A may be made adjustable for rebalancing purposes as indicated in Fig. 2B. With this alternative arrangement it will be clear that for each value of the illumination on photoelectric cell 1 there will be a corresponding position of the point of engagement of conductor 25 and resistor 3A at which the potential relation between the control grid 21 and cathode 19 of valve 17 is such that the motor 44 will be de-energized and upon a change in the illumination on photoelectric cell 1 the potential relation between the control grid 21 and cathode 19 will be varied to cause energization of the motor 44 for rotation in the proper direction to adjust the point of engagement of conductor 25 and resistor 3A as required to restore this normal potential relation and thereby de-energize motor 44.

Figure 3:
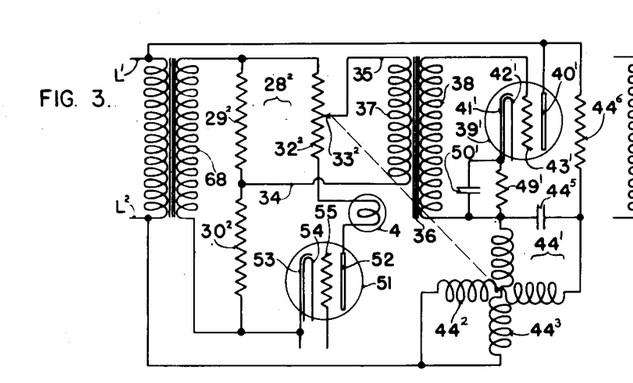
Figs. 3–6 illustrate modifications of a portion of the arrangements of Figs. 2, 2A and 2B.

In Fig. 3 I have illustrated, more or less diagrammatically, a modification of a portion of the arrangements shown in Figs. 2, 2A and 2B in which the electronic valve 51 is connected in one arm of a Wheatstone bridge network 28$^2$, which arm also includes the lamp 4, and in which the bridge network 28$^2$ is adapted to be rebalanced upon a change in the illumination on the photoelectric cell 1 by a reversible motor 44$^1$.

The remaining arms of the bridge network are comprised of resistors 29$^2$, 30$^2$, and 32$^2$ and as illustrated energizing current is supplied to the bridge network from the transformer secondary winding 68, the terminals of which are connected to one pair of bridge conjugate points. The other pair of bridge conjugate points are connected by conductors 34 and 35 to the terminals of the primary winding 37 of transformer 36 and it is noted one of the last mentioned conjugate points is the point of engagement of a bridge rebalancing contact 33$^2$ with the resistor 32$^2$.

The motor 44$^1$ is a two phase motor having one winding 44$^2$ connected across the supply conductors L$^1$ and L$^2$ in series circuit relation with a resistor 44$^6$ of suitable value and the other winding 44$^3$ connected across the supply conductors in series circuit relation with an electronic valve 39$^1$, the conductivity of which is adapted to be controlled by the bridge network 28$^2$. The valve 39$^1$ is a heater type triode and includes an anode 40$^1$, a cathode 41$^1$, a heater filament 42$^1$ and a control grid 43$^1$. As illustrated one terminal of the transformer secondary winding 38 is connected to the control grid 43$^1$ and the other terminal is connected to the cathode 41$^1$ through a biasing resistor 49$^1$ which is shunted by a condenser 50$^1$. The anode circuit of valve 39$^1$ is arranged to be energized from the alternating current supply conductors L$^1$ and L$^2$ so that this valve will alternately be conductive and non-conductive and the magnitude of pulsating current conducted by the valve is adapted to be varied by the alternating voltage induced in the transformer secondary winding 38 as a result of bridge network unbalance.

A condenser 44$^5$ of suitable value is connected between the top end of motor winding 44$^3$, as seen in Fig. 3, and the conductor joining the motor winding 44$^2$ to the resistor 44$^6$, and as will be readily apparent, when the effective conductivity of valve 39$^1$ is identical with that of resistor 44$^6$, the potentials on both terminals of the condenser 44$^5$ will be the same and the motor will remain stationary. As the conductivity of valve 39$^1$ varies, however, the impedance of the circuit path including the motor winding 44$^3$ will vary with respect to that of the motor winding 44$^2$ with the result that a difference of potential will exist across the terminals of condenser 44$^5$. In effect the latter will then be connected in series circuit relation with one motor winding and this arrangement in parallel with the other motor winding so that the current flow through the first mentioned motor winding will be caused to lead the current flow through the other motor winding and thereby produce rotation of the motor in one direction or the other. This arrangement for selectively controlling a motor for reversible operation is disclosed and claimed in my copending application Serial No. 159,198, filed August 14, 1937.

Thus, on a change in the illumination of photoelectric cell 1, the resulting change in conductivity of valve 51 will result in a change in the energizing current supplied the bridge network 28$^2$ and thereby vary the illumination of lamp 4 in the proper direction to balance the illumination on the two photoelectric cells and simultaneously cause the bridge network 28$^2$ to be unbalanced resulting in the appearance of an unbalanced alternating voltage across its equalizing terminals. This unbalanced voltage is impressed on the input circuit of the valve 39$^1$ whereby the conductivity of the valve is varied as required to produce selective rotation of the motor 44$^1$ in the proper direction to reduce the unbalanced voltage.

Figure 4:
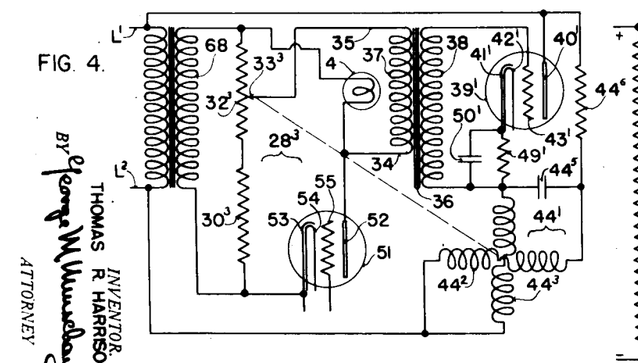

In Fig. 4 I have illustrated a modification of the arrangement shown in Fig. 3 in which the electronic valve 51 comprises one arm of a Wheatstone bridge network 28³ and the lamp 4, which is connected in the anode circuit of valve 51, comprises another arm thereof. The remaining bridge arms are made up of resistors 30³ and 32³. Energizing current is supplied the bridge network from the transformer secondary winding 68, the terminals of which are connected to one pair of bridge conjugate points, and the other pair of bridge conjugate points are connected by conductors 34 and 35 to the terminals of the transformer primary winding 37. Bridge rebalancing means are provided in the form of a contact 33³ which comprises one of the last mentioned bridge conjugate points and is adapted to be moved along the slidewire resistor 32³, and in this arrangement this adjustment is shown as adapted to be effected by the motor 44¹ as in the arrangement described in Fig. 3. Thus, when the value of light falling on the photoelectric cell 1 changes, the resultant change in the conductivity of valve 51 changes the flow of energizing current through the lamp 4 until the illumination on the two photoelectric cells is again balanced, and simultaneously unbalances the bridge 28³. The unbalanced electromotive forces produced in the bridge are applied to the electronic valve 39¹ and are thereby employed to selectively control the motor 44¹ for rotation in the proper direction to effect the necessary adjustment of contact 33³ along the slidewire resistor 32³ to reduce the unbalanced electromotive forces.

Figure 5:
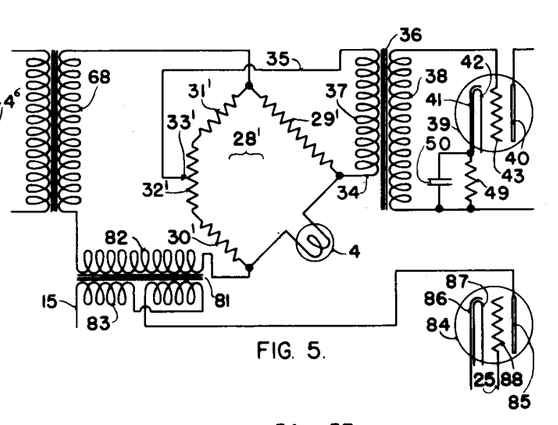

In Fig. 5 I have illustrated a further modification of the arrangements of Figs. 2, 2A and 2B in which the electronic valve 51 has been replaced by a saturating reactor 81 and the electronic valve 17 has been replaced by an electronic valve 84. It will be understood the electronic valve 17 may be employed in this arrangement if desired. The saturating reactor 81 comprises an alternating current winding 82 and a direct current winding 83 which are wound on a saturable core, the saturation of which is controlled in accordance with the current flow through the direct current winding 83. When the direct current winding is deenergized the alternating current winding 82 presents a relatively high impedance to the flow of current therethrough, but as the current flow through the direct current winding 83 is increased, the magnetic saturation of the core is increased, and, due to this action, the effective resistance of the alternating current winding 82 is decreased to a corresponding extent. The alternating current winding 82 is connected in series circuit relation with the energizing terminals of a bridge network 28¹ which may be similar to the correspondingly identified part of Figs. 2, 2A and 2B and the terminals of this series circuit are connected with the terminals of the transformer secondary winding 68.

The electronic valve 84 is a heater type triode and includes an anode 85, a cathode 86, a heater filament 87, and a control grid 88. With this arrangement the photoelectric cell 3 is preferably arranged to be subjected to light from the interior of furnace 2 and the photoelectric cell 1 is arranged to be illuminated by lamp 4. Thus, for example, when light is focussed on the photoelectric cell 3, the potential on grid 88 is rendered less negative and thereby the conductivity of valve 84 is increased resulting in an increase in current flow through the direct current winding 83 of the saturating reactor 81. The consequent reduction in impedance of the alternating current winding 82 results in an increase in the energizing current supplied to the bridge network 28¹ and thereby the illumination of lamp 4 is changed sufficiently to restore the balance of illumination on the two photoelectric cells. As will be clearly apparent this increase in energizing current to lamp 4 produces a non-linear change in the potential drop in the lamp filament resistance so that an unbalanced electromotive force appears across the equalizing terminals of the bridge network 28¹. This unbalanced electromotive force is amplified and the amplified quantity is applied to one phase winding 45 of reversible motor 44 for controlling the energization of the motor in the proper direction to effect the necessary adjustment of the contact 33¹ along the resistor 32¹ to reduce the bridge unbalance.

Figure 6:
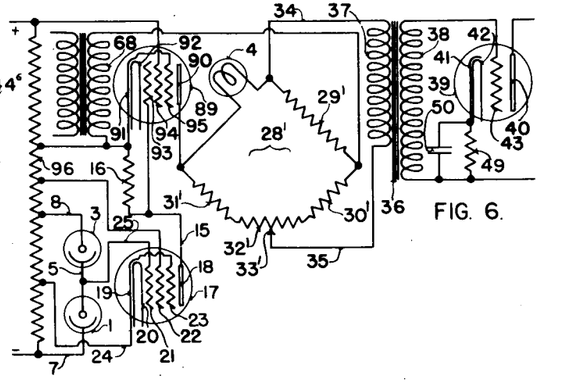

In Fig. 6 I have illustrated a further modification of the arrangements shown in Figs. 2, 2A and 2B in which the electronic valve 51 has been replaced by an electronic valve 89 which as shown is a heater type pentode and includes an anode 90, a cathode 91, a heater filament 92, a control grid 93, a screen grid 94 and a suppressor grid 95. The anode circuit of valve 89 is connected in a series circuit including the bridge network 28¹ and the transformer secondary winding 68 as in the previous arrangements so that bridge unbalance will result in the appearance of an alternating voltage across the bridge equalizing terminals which may be amplified and employed to selectively control the energization of motor 44 for effecting movement of contact 33¹ in the proper direction to reduce the bridge unbalance, and for increasing the sensitivity of the instrument a direct current voltage is maintained on the screen grid 94.

As shown the direct current voltage is obtained from a voltage divider 96 which desirably may be energized from a rectifier similar to the rectifier 61 of Fig. 2, and a portion of the potential drop across voltage divider 96 is employed for energizing the photoelectric cells 1 and 3 and the electronic valve 17. The photoelectric cells 1 and 3 are connected across a suitable portion of the voltage divider by conductors 7 and 8, the cathode 19 of valve 17 is connected to a point between the points of connection of conductors 7 and 8 thereto and the control grid 21 is connected by conductor 25 to conductor 5 which connects the two photoelectric cells. The screen grid 22 may be connected to a point on the voltage divider 96 which is positive with respect to the point of connection of the cathode 19.

Thus, when the illumination on photoelectric cell 1 changes, the conductivity of valve 17 will be changed to a corresponding extent and the potential drop across resistor 16 will be varied accordingly. The conductivity of valve 89 will then be changed and the pulsating current supplied to bridge 28¹ will consequently be varied, resulting in a change in illumination of lamp 4 sufficient to establish a balance of illumination on the two photoelectric cells 1 and 3, and thereby in the appearance of a pulsating unbalanced voltage across the bridge equalizing terminals. This pulsating voltage is amplified by the valve 39 and is employed to cause selective energization of reversible motor 44 for rotation in the proper direction to effect adjustment of the bridge rebalancing contact 33¹ along resistor 32¹ for reducing the unbalance voltage to zero.

It will be apparent that a chart 57 may be arranged in cooperative relation with the rebalancing resistor in the modifications illustrated in Figs. 2–6 and that a pen may be mounted on the carrier of the rebalancing contact for recording the variations in illumination on photoelectric cell 1.

Figure 7:
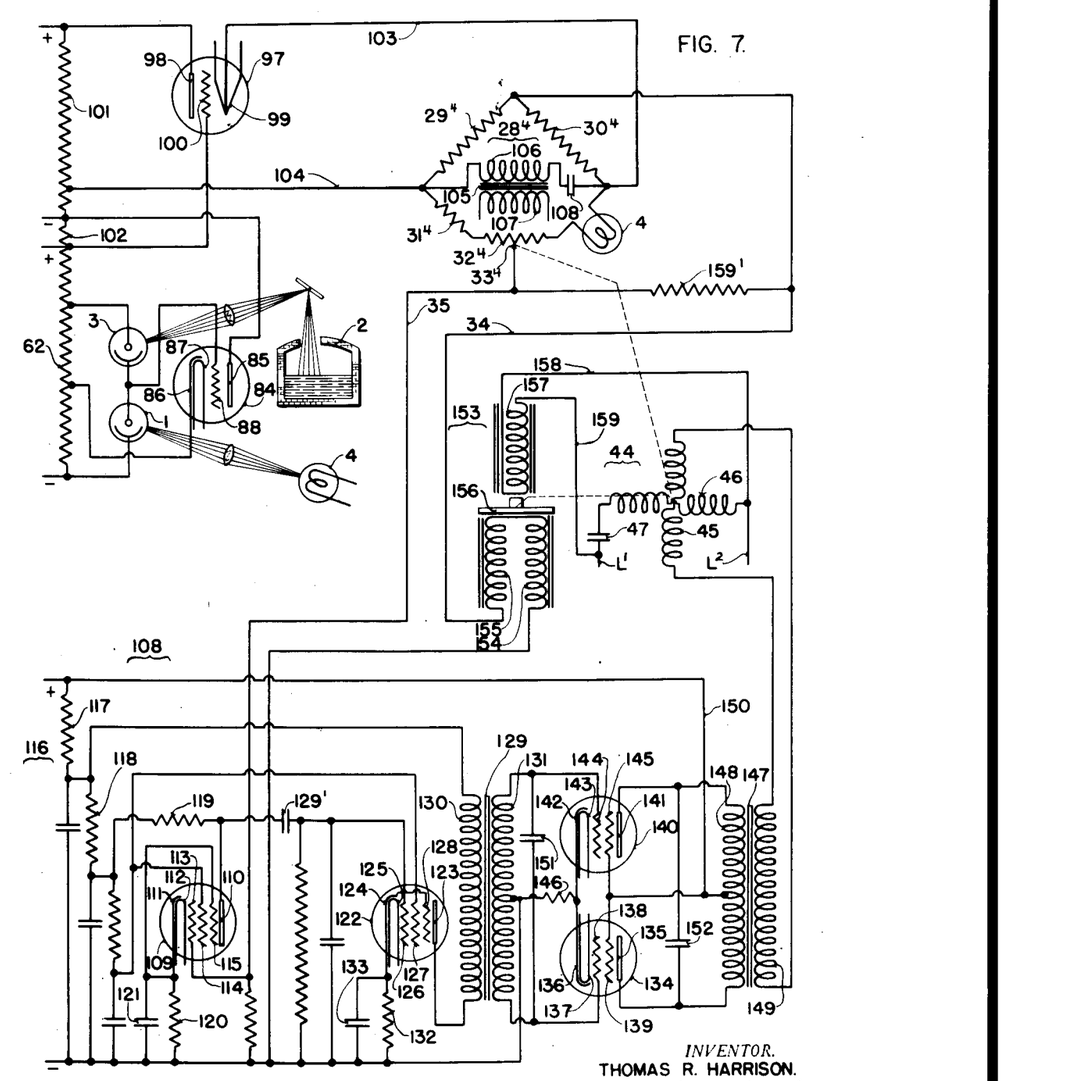
Fig. 7 illustrates a further modification of the arrangements of Figs. 2, 2A and 2B.

In Fig. 7 I have illustrated a further modification of the arrangements of Figs. 2, 2A and 2B in which the balancing lamp 4 is energized by direct current and the value of direct current required to rebalance the illumination on the photoelectric cells is measured by a Wheatstone bridge network 28⁴ on which an alternating voltage of small amplitude is imposed. In this arrangement a lamp 4 is employed in one arm of the bridge and the remaining bridge arms are comprised of fixed resistors 29⁴, 30⁴, and 31⁴, and a slidewire resistor 32⁴ is connected between the last mentioned bridge arm and the lamp 4. A contact 33⁴ is adapted to be moved along the resistor 32⁴ for rebalancing purposes and as in the previous arrangements described this adjustment may conveniently be effected by a motor 44. The small alternating voltage referred to is impressed on the bridge through a condenser 108 by the secondary winding 106 of a transformer 105, the primary 107 of which is connected to the alternating current supply lines L¹ and L². When the bridge is out of balance, an unbalanced part of the small alternating voltage impressed on the bridge appears across the bridge equalizing terminals, which unbalanced voltage may be amplified and the amplified quantity may be impressed on one phase winding 45 of motor 44 for selectively controlling the motor energization for rotation in one direction or the other and thereby movement of the rebalancing contact in the proper direction to reduce the bridge unbalance.

As shown an electronic valve 84 is employed for detecting and amplifying the variations in illumination on the photoelectric cell 3 as in the arrangement disclosed in Fig. 5, and the change in current conducted by the valve 84 is employed to vary the conductivity of an electronic valve 97. The valve 97 is a triode and includes an anode 98, a heater cathode 99, and a control grid 100. Anode voltage is supplied the valve 84 from a voltage divider 62 which may be energized from a rectifier 61 through a filter 79 as shown in Fig. 2 and anode voltage is supplied the valve 97 from a voltage divider 101 which may be energized from a similar rectifier and filter arrangement.

It will be noted the anode 98 of valve 100 is connected to the positive terminal of voltage divider 101 and the cathode 99 is connected by a conductor 103 to one energizing terminal of the bridge network 28⁴ and the other bridge energizing terminal is connected by a conductor 104 to a point on the voltage divider 101 such that suitable anode and grid bias potentials will be maintained on the valve.

A resistor 102 connected in the anode circuit of valve 84 is connected between the positive terminal of voltage divider 62 and the negative terminal of voltage divider 101, and the control grid 100 of valve 97 is connected to the positive terminal of voltage divider 62 so that, when the conductivity of valve 84 changes in response to a change in the illumination on photoelectric cell 3, the potential on the control grid 100 will be varied to a corresponding extent.

The flow of energizing current to the bridge network 28⁴ will then be varied by an amount sufficient to change the illumination of lamp 4 until the illumination on the photoelectric cells 1 and 3 is again balanced and because of the temperature coefficient of resistance of the lamp filament the effective resistance thereof will be changed to a corresponding extent resulting in the appearance of an unbalanced electromotive force across the bridge equalizing terminals.

This unbalanced voltage may be amplified by the amplifier valve 39 shown in the previous arrangements, but in this arrangement I have shown an amplifier 108 that I prefer to employ for this purpose because of the greater sensitivity and motor driving torque obtainable. It will be understood the amplifier 108 may be employed in lieu of the valve 39 in the previous arrangements described if it is so desired.

As shown the bridge equalizing conductors 34 and 35 are connected to the input circuit of a valve 109 which valve is a heater type pentode including an anode 110, a cathode 111, a heater filament 112, a control grid 113, a screen grid 114, and a suppressor grid 115. Anode voltage is supplied to the valve 109 from the terminals of a filter 116 which may be energized from a suitable rectifier (not shown).

The positive side of the filter is connected to the anode 110 through resistors 117, 118, and 119, and the negative side of the filter is connected to the cathode 111 through a biasing resistor 120 which is shunted by a condenser 121. The flow of current through valve 109 is normally maintained at a mean value due to the action of the biasing resistor 120 but when an alternating voltage appears across the equalizing terminals of the bridge network 28⁴, the valve 109 is alternately rendered more conductive and less conductive resulting in a pulsating potential drop across resistor 119.

This pulsating potential drop is applied to the control grid 126 of a valve 122 through a coupling condenser 129¹. The valve 122 is a heater type pentode and includes an anode 123, a cathode 124, a heater filament 125, a control grid 126, a screen grid 127 and a suppressor grid 128. Anode voltage is supplied to the valve 122 from the filter 116 and as shown the anode 123 is connected to the positive side of the filter through the primary winding 130 of transformer 129 and the resistor 117, and the cathode 124 is connected to the negative side of the filter through a biasing resistor 132 which is shunted by a condenser 133. The flow of current through valve 122 is normally maintained at a mean value due to the action of biasing resistor 132, but when a pulsating potential is applied to the control grid 126, the valve is alternately rendered more conductive and less conductive, resulting in the flow of pulsating direct current through the primary winding 130 of transformer 129. This pulsating current flow through the transformer primary winding sets up a fluctuating magnetic field which induces an alternating voltage across the terminals of the transformer secondary winding 131.

This alternating voltage is impressed on the input circuits of a second pair of electronic valves 134 and 140. The valves 134 and 140 are heater type tetrodes and may desirably be of the type commercially known as beam power amplifier tubes. The valve 134 includes an anode 135, a cathode 136, a heater filament 137, a control grid 138 and a screen grid 139, and the valve 140 includes an anode 141, a cathode 142, a heater filament 143, a control grid 144 and a screen grid 145. The heater filaments 137 and 143 may be connected in parallel with the heater filaments 112 and 125 of valves 109 and 122, respectively and arranged to receive energizing current from any suitable alternating current or direct current source, as desired.

One terminal of the transformer secondary winding 131 is connected to the control grid 138, the other terminal is connected to the control grid 144 and a cathode biasing resistor 146 is connected between a center tap on the secondary winding 131 and the cathodes 136 and 142, which, as shown, are connected together. The anodes 135 and 141 are connected to the opposite terminals of the primary windng 148 of a transformer 147 and a center tap on the transformer primary winding 148 is connected by a conductor 150 to the positive side of filter 116 and the negative side of the filter is connected to the negative end of the biasing resistor 146 so that full wave rectified current is maintained on the anode circuits of valves 134 and 140. When an alternating voltage appears across the terminals of the transformer secondary winding 131, the potentials of grids 138 and 144 are swung, in opposite phase, at a frequency corresponding to the supply line frequency and the valves 134 and 140 are alternately rendered more conductive and less conductive, one valve being more conductive while the other is less conductive. The resulting pulsating current flows through the transformer primary winding 148 in successively opposite directions through the opposite halves of the transformer result in the induction of an alternating voltage of line frequency in the transformer secondary winding 149 whose phase and amplitude is determined by the phase and amplitude of the unbalance currents through the bridge equalizing conductors 34 and 35.

The terminals of the transformer secondary winding 149 are connected to the phase winding 45 of the reversible motor 44 and the other phase winding 46 is connected to the alternating current supply lines L¹ and L² through the condenser 47. Thus, depending on the direction of bridge unbalance, the motor 44 will be energized for rotation in one direction or the other to thereby effect an adjusting movement of the bridge rebalancing contact 33⁴ in the proper direction to reduce the bridge unbalance to zero.

As shown condensers 151 and 152 are connected in shunt to the transformer windings 131 and 148, respectively. Due to the action of condenser 151 a full wave electromotive force is impressed upon the grids 138 and 144 from the pulsating current flows impressed upon the winding 130 by the valve 122. The condenser 152 tunes to resonance the transformer 147 and its load consisting of the motor windings so that the current flows through motor winding 45 will be a maximum for any unbalance of the bridge network 28⁴.

It will be apparent a pen may be mounted on the carrier of the bridge rebalancing contact 33⁴ as in the other arrangements disclosed herein and arranged in cooperative relation with a recorder chart to provide a continuous record of the variations in the temperature of the interior of the furnace 2.

In order that the speed of motor 44 may be as great as possible during rebalancing without overshooting of the balance point and consequent hunting taking place, means have been provided in this arrangement to ensure that the motor speed diminishes proportionately as the balance position is approached. This result is obtained by introducing into the network, in circuit with the unbalanced voltage, a voltage whose magnitude is a function of the motor speed. Thus, as the bridge rebalancing contact 33⁴ approaches its new balance position, the unbalance voltage will decrease in value and if the motor speed is then such that it would ordinarily coast beyond the balanced position due to its inertia, the opposing voltage which is introduced in circuit will be appreciably greater than the unbalance voltage and will tend to effect energization of the motor in the opposite direction and thereby produces a positive damping action which will check the motor speed before balance is reached and gradually reduce it to zero as the unbalance is reduced to zero. Specifically two opposed windings 154 and 155 of an induction disc generator 153 are connected in series with the conductors 34 and 35, and the windings are so arranged that the generated voltage will be opposed to the unbalanced voltage of the bridge network 28⁴.

The induction disc generator 153 comprises a rotatable aluminum or copper disc 156 which may be driven directly from the motor shaft or through suitable gearing, as desired, having a winding 157 connected by conductors 158 and 159 to the alternating current supply lines L¹ and L². The winding 157 is arranged on one side of the disc 151 in such manner that the alternating magnetic flux set up by it will pass through the disc, and the opposed windings 154 and 155 are arranged side by side on the opposite side of the disc in such positions relative to the winding 157 that, when the disc 156 is stationary, equal numbers of lines of the alternating magnetic flux will thread the windings 154 and 155 with the result that normally the resultant voltage induced in these windings will be zero. When the disc 156 is rotated, however, the alternating magnetic flux set up by winding 157 is distorted, and, depending upon the direction of rotation of the disc 156, more lines of flux will thread one of the windings 154 or 155 than the other and, as a result, an alternating voltage of corresponding phase will appear across the terminals of these windings.

This voltage will be substantially in phase with or 180° out of phase with the line voltage, depending upon the direction of rotation of the disc 156, and it will be apparent that the amplitude of the induced voltage will be directly dependent on the speed of rotation of the disc. For example, if the speed of rotation of the disc is low, the degree of distortion of the alternating magnetic field set up by the field 157 will be correspondingly slight, and as a result the voltages induced in the windings 154 and 155 will be nearly equal so that the resultant difference will be small. As the speed of rotation of the disc is increased, however, the degree of distortion of the magnetic field will become greater, and thereupon the voltage induced in one or the other of the windings 154 or 155 will become greater to a corresponding extent than the voltage induced in the other winding. Thus, if the motor speed is such that when the bridge rebalancing contact 33⁴ approaches its new balanced position it would ordinarily coast beyond the balanced position due to its inertia, the damping voltage which is introduced in circuit will be predominant and will quickly check the speed of the motor and the motor will subsequently come to rest precisely on the new balance position.

It is noted that in the event the bridge rebalancing contact 33⁴ should become disengaged from the resistor 32⁴ during rebalancing the bridge unbalance voltage will be disconnected from the input circuit of valve 109 and thereby cause deenergization of the motor. In order to prevent coasting of the motor, if it should then happen to be speeding, and resultant overtravel of the bridge rebalancing contact, means have also been provided in this arrangement in the form of a resistor 159¹ connected between the bridge equalizing conductors 34 and 35 for maintaining the voltage introduced into circuit by the induction disc generator effective when the bridge rebalancing contact 33⁴ and resistor 33³ are disengaged. Thus, if the bridge rebalancing contact and its associated resistor should become disengaged while the system is being rebalanced, the opposed voltage introduced into the network by the induction disc generator will be impressed on the input circuit of valve 109 through the resistor 159¹, and will be effective to quickly check the speed of the motor.

Figure 8:
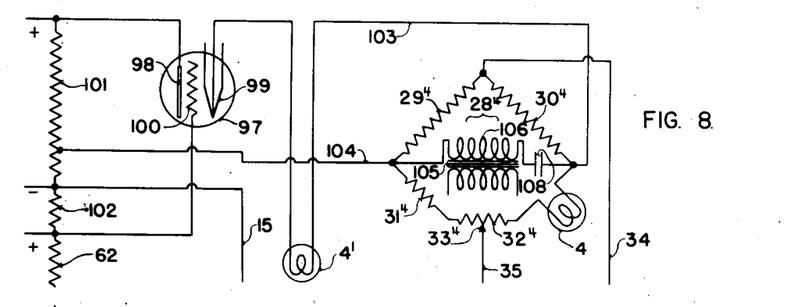
Figure 9:
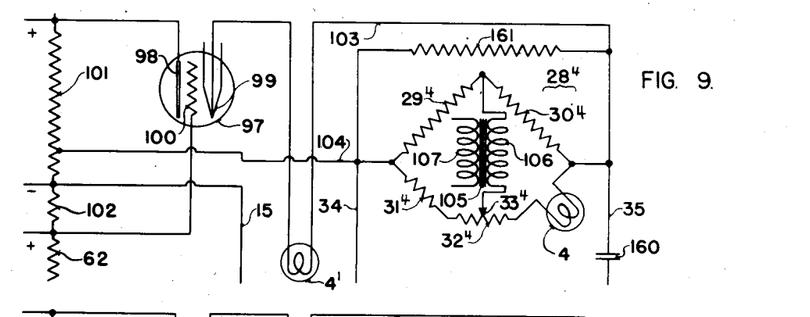
Figure 10:
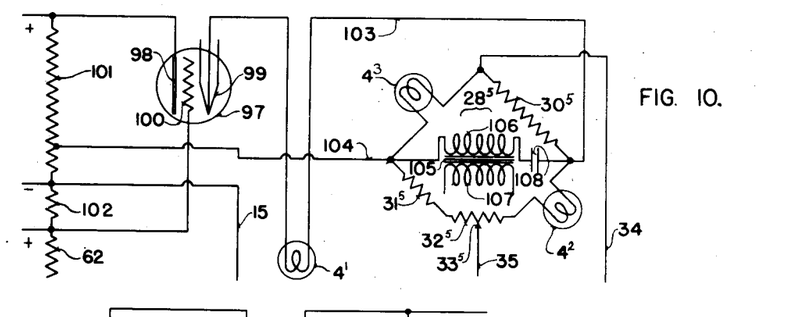

In Figs. 8–10 I have illustrated, more or less diagrammatically, various modifications of a portion of the arrangement shown in Fig. 7 in which an auxiliary lamp is employed for balancing the illumination on the two photoelectric cells. The use of such an auxiliary balancing lamp is advantageous in that the lamp bridge components may be located in a recorder at a point remote from the furnace 2 without the use of extra connections to the balancing lamp.

In the modification shown in Fig. 8 it will be noted a lamp 4¹ is inserted in the conductor 103 in series with the energizing terminals of the bridge network 28⁴. The lamp 4¹ is arranged to illuminate the photoelectric cell 1 and the bridge network 28⁴ is employed for measuring the energizing current supplied to the lamp 4¹. Thus, upon variation in the illumination of photoelectric cell 1, the energizing current to the lamp 4¹ will be changed by an amount sufficient to restore the balance of illumination on the two photoelectric cells, and this change of current through the bridge network 28⁴ will result in unbalance of the bridge to a corresponding extent and thereby in selective energization of the motor 44 for effecting movement of the bridge rebalancing contact 33⁴ in the proper direction to reduce the bridge unbalance. The new position of the contact 33⁴ will then be a measure of the energizing current supplied to the lamp 4¹ and thereby of the temperature of the furnace 2.

In the arrangement illustrated in Fig. 9 the transformer secondary winding 106 is connected across the bridge equalizing terminals and it will be noted one of these terminals is the point of contact of the rebalancing contact 33⁴ and the slidewire resistor 32⁴. Conductors 34 and 35 which are connected to the input circuit of the amplifier are connected to the bridge energizing terminals through a condenser 160 which may be inserted in the conductor 35.

In operation improved performance of the instrument is obtainable when the direct current flow through the lamp 4 is limited to a relatively small value, for example, 25 milliamperes. For the motor 44 to develop maximum speed and torque for a given unbalance of the bridge network 28⁴ it will be apparent the wave form of the voltage supplied to the phase winding 45 from the amplifier must be substantially sinusoidal and must be either in phase with or 180° out of phase with the supply line voltage. If the wave form and the phase of the amplifier output voltage is distorted, the speed and torque of the motor 44 will be reduced resulting in reduced sensitivity of the instrument. Limiting the direct current flow through the lamp 4 to a small value improves the wave form and reduces phase distortion of the bridge unbalance voltage for a reason which may best be explained mathematically. In the equation given below R is the direct current resistance of the lamp, $r$ is the incremental resistance change of the lamp due to the alternating current flowing through it, I is the steady direct current and $i$ is the alternating current. The voltage drop across the lamp may thus be expressed as follows:

$$(I \pm i)(R \pm r) = IR \pm iR \pm Ir \pm ir$$

IR is the steady voltage drop due to the direct current, $iR$ is drop due to the alternating current and is balanced out by the bridge and so is not impressed on the amplifier input circuit, and $ir$ is the drop due to the alternating current and the incremental resistance. This voltage drop is not balanced out but since both $i$ and $r$ are small their joint effect is negligible. $Ir$, however, is the potential drop due to the direct current and the incremental resistance of the filament, and is out of phase with the supply line voltage due to the thermal lag of the filament. This potential drop increases in direct proportion to I, and since it is not balanced out, it is impressed on the amplifier input circuit. Thus, it will be clear that by limiting I the degree of distortion of the phase of the bridge unbalanced voltage may be minimized, and I have found that up to approximately 25 milliamperes direct current flow through the lamp the distortion is negligible.

The flow of direct current through the lamp 4 may be so minimized by connecting a resistor 161 in shunt with the bridge energizing terminals as shown in Fig. 9 or by using a double lamp bridge as shown in Fig. 10. In the modification illustrated in Fig. 10 a bridge network 28⁵ is employed instead of the bridge network 28⁴ and it will be noted this bridge includes lamps 4² and 4³ as two arms and resistors 30⁵, 31⁵ and 32⁵ in the remaining arms. The equalizing terminals of the bridge are connected through conductors 34 and 35 to the input circuit of the amplifier and it will be noted one of the equalizing terminals is the point of connection of a contact 33⁵ and the slidewire resistor 32⁵. With this arrangement the circuit constants are preferably adjusted so that equal currents flow through the lamps 4² and 4³ and it will be apparent that with a separate lamp so connected in opposite bridge arms that the current flow required through each for producing the same unbalanced voltage upon a change in the current supplied to the lamp 4¹ is reduced to half of that required when only one lamp is employed in the bridge, and thereby the distortion of the wave form and phase of the unbalanced voltage is minimized.

In Fig. 11 I have illustrated a further modification of the arrangement shown in Fig. 7 in which it is not necessary to impress an alternating voltage on the lamp bridge network in order to utilize the bridge unbalance for causing selective energization of the motor 44. As shown in this arrangement the bridge network employed includes the lamp 4 as one arm, and fixed resistors 30⁶, 31⁶, and 32⁶ in the remaining arms. The cathode 99 of valve 97 is connected by conductor 103 to one bridge energizing terminal and the other bridge energizing terminal is connected by conductor 104 to a suitable point on the voltage divider 101. One equalizing terminal of the bridge is connected by a conductor 163 to the control grid 169 of an electronic valve 165 and the other bridge equalizing terminal is connected by a conductor 164 to the control grid 174 of an electronic valve 170. The valve 165 is a heater type triode and includes an anode 166, a cathode 167, a heater filament 168 and the control grid 169, and the valve 170 is a heater type triode and includes an anode 171, a cathode 172, a heater filament 173, and a control grid 174. The cathodes 167 and 172 are connected together and are connected through a biasing resistor 175 to the negative bridge energizing terminal.

Anode voltage is supplied to the valves 165 and 170 from a suitable direct current source which may be obtained, for example, through conductors 176 and 177 from the output terminals of a suitable rectifier (not shown). It will be noted the valves 165 and 170 are connected in a bridge circuit, one valve being included in each of the opposed arms, and resistors 178 and 179 in the respective remaining arms. As shown resistor 178 is connected in the anode circuit of valve 165 and resistor 179 is connected in the anode circuit of valve 170. Conductor 176 is connected to the negative end of the biasing resistor 175 and conductor 177 is connected to the positive ends of resistors 178 and 179.

The anode 166 of valve 165 is connected to the control grid 184 of an electronic valve 180 and the anode 171 of valve 170 is connected to the control grid 189 of an electronic valve 185. A connection is also provided from the anodes 166 and 171 to the cathodes 182 and 187 of valves 180 and 185 through a respective resistor 180¹ and 185¹ and a cathode biasing resistor 195. The valve 180 is a heater type triode and includes an anode 181, the cathode 182, a heater filament 183, and the control grid 184, and the valve 185 includes an anode 186, the cathode 187, a heater filament 188, and the control grid 189. The anode 181 of valve 180 is connected to one end of the primary winding 191 of a transformer 190, and the other end of the winding is connected to the anode 186 of valve 185. A center tap on the primary winding 191 is connected to one end of the secondary winding 194 of a transformer 193, the primary winding 195 of which is connected to the alternating current supply lines L¹ and L², and the other end of the secondary winding is connected through the biasing resistor 195 to the cathodes 182 and 187, which, as shown, are connected together. Thus alternating voltage is supplied to the anode circuits of valves 180 and 185 and the pulsating currents conducted by these valves is adapted to be varied by the direct current potentials maintained on their respective control grids 184 and 189.

It will be apparent that by properly proportioning resistors 30⁶, 31⁶, and 32⁶ of the bridge network that for a given flow of current through these resistors the potential on the control grid 169 of valve 165, with the contact 33⁶ at a corresponding position along the slidewire resistor 32⁶, will be same as the potential on the control grid 174 of valve 170. The current flows through valves 165 and 170 will then be substantially identical in value and thereby the potentials on the control grids 184 and 189 will be identical. When the grids 184 and 189 are at the same potential both triodes 180 and 185 will be equally conductive, and the pulsating anode current flows through opposite halves of the transformer primary winding 191 will induce magneto-motive forces in the transformer 190 which are equal and opposite with the result that no voltage will be induced in the secondary winding 192. When the conductivity of valve 97 changes, however, as a result of a change in the illumination on photoelectric cell 3, the potential on the control grid 169 of valve 165 will become different from that on the control grid 174 of valve 170, and consequently the conductivities of valves 165 and 170 will be rendered different, resulting in a difference in the potentials applied to the control grids 184 and 189. The conductivities of triodes 180 and 185 are thus varied to a corresponding extent resulting in the induction of an alternating voltage, of phase corresponding to the direction of change in the bridge energizing current, across the terminals of the transformer secondary winding 192.

The alternating voltage so induced in the secondary winding 192 is impressed on the input circuits of a second pair of electronic valves 134 and 140 which may be similar to the correspondingly identified parts of Fig. 7. One terminal of the secondary winding 192 is connected to the control grid 138 of valve 134, the other terminal is connected to the control grid 144 of valve 140, and a biasing resistor 146 is connected between a center tap on the secondary winding 192 and the cathodes 136 and 142, which as shown, are connected together. The anodes 135 and 141 are connected to opposite terminals of the primary winding 148 of transformer 147. A center tap on the primary winding 148 is connected by a conductor 150 to the conductor 177 and thereby to the positive side of the direct current supply voltage, and the negative side thereof is connected by conductors 176 and 104 to the negative end of the biasing resistor 146.

This arrangement operates in a manner similar to the arrangement disclosed in Fig. 7 to produce an alternating voltage across the terminals of the transformer secondary winding 149 which is in phase with the line voltage or displaced 180° therefrom depending upon the direction of bridge network unbalance. The terminals of the transformer secondary winding 149 are connected to the phase winding 45 of motor 44, and the other phase winding 46 is connected to the supply lines L¹ and L² through the condenser 47. Thus, depending upon the direction of bridge network unbalance the motor will be energized for rotation in one direction or the other to thereby effect an adjusting movement of the contact 33⁶ along the slidewire resistor 32⁶ in the proper direction to reduce the bridge unbalance.

As shown an induction disc generator 153 is provided as in the arrangement of Fig. 7 for checking the motor speed during rebalancing so that overshooting and consequent hunting will be minimized. The opposed windings 154 and 155 are connected in circuit between the bridge rebalancing contact 33⁶ and the control grid 174 of valve 170. It will be understood these generator windings may be connected in circuit with the control grid 169 of valve 165 and the other bridge equalizing terminal, if desired.

If desired, a chart 57 as shown in Fig. 1 may be arranged in cooperative relation with the slidewire resistor 32⁶ and a pen may be mounted on the carrier of the contact 32⁶ for recording the variations in the temperature of the interior of the furnace 2.

Figure 12:
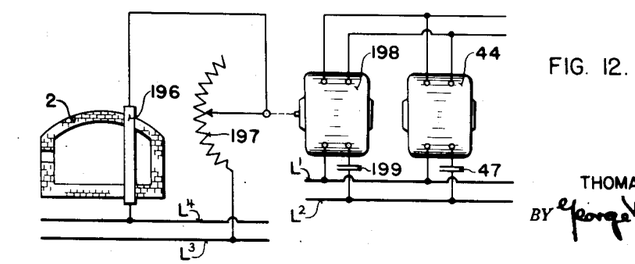
Fig. 12 is a diagrammatic view illustrating the use of my invention in a control system.

It will be apparent that motor 44 may be employed to operate a control valve or a rheostat for governing the application of an agent to a furnace for producing heat, for example, to the radiant energy of which the photoelectric cell 1 is responsive, or another motor desirably operated together with the motor 44 may be so employed. For example, as shown in Fig. 12, a furnace 2, to the radiant energy of which the photoelectric cell 3 is responsive, is heated by a resistor 196 which is connected to electric supply conductors L³ and L⁴ through a rheostat 197, the adjustment of which is effected by a motor 198. The motor 198 may be exactly like the motor 44 and in Fig. 12 is shown as having one phase winding connected in parallel with the phase winding 45 of motor 44 which is connected to the terminals of transformer secondary winding 149, and the other phase winding is connected through a condenser 199 to the supply lines L¹ and L². The mechanical connection of the rheostat 197 to the motor 198 is such as to increase and decrease the supply of electric current to the resistor 196 as the radiant energy to which the photoelectric cell 3 is responsive drops below or rises above a predetermined level.

Subject matter disclosed in this application and not claimed is being claimed in my divisional application Serial Number 370,815, filed December 19, 1940. That subject matter consists of the arrangements disclosed in Figs. 2, 2A, and 2B modified to include the saturating reactor means shown in Fig. 5.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

I claim:

1. Photometric measuring apparatus including the combination of a light sensitive device responsive to change in magnitude of a variable condition, a second light sensitive device, an electric lamp arranged to illuminate said second light sensitive device, means under control of said first mentioned light sensitive device for energizing said lamp so that the illumination of said second mentioned light sensitive device is definitely related to that of the first mentioned light sensitive device, a Wheatstone bridge network connected in circuit with said lamp and said energizing means adapted to be unbalanced in accordance with the sense and extent of the change in said lamp energizing means, a reversible electrical motor adapted to rebalance said bridge network, and means responsive to said unbalance for continuously controlling said reversible electrical motor.

2. Photometric measuring apparatus including the combination of a light sensitive device responsive to change in magnitude of a variable condition, a second light sensitive device, an electric lamp arranged to illuminate said second light sensitive device, means under control of said first mentioned light sensitive device for energizing said lamp so that the illumination of said second light sensitive device is definitely related to that of the first mentioned light sensitive device, a Wheatstone bridge network connected in circuit with said lamp and said energizing means and adapted to be unbalanced in accordance with the sense and extent of the change in said lamp energizing means, a reversible electrical motor adapted to reduce said bridge network unbalance, means responsive to said unbalance for continuously controlling said reversible electrical motor, and arresting means for interrupting the operation of said motor when said bridge network unbalance has been reduced to zero.

3. Photometric measuring apparatus including the combination of a light sensitive device responsive to change in magnitude of a variable condition, a second light sensitive device, an electric lamp arranged to illuminate said second light sensitive device, means under control of said first mentioned light sensitive device for energizing said lamp so that the illumination of said second mentioned light sensitive device is definitely related to that of the first mentioned light sensitive device, a Wheatstone bridge network including said lamp in one arm thereof and connected in circuit with said energizing means and adapted to be unbalanced in accordance with the sense and extent of the change in said energizing means, a reversible electrical motor adapted to rebalance said bridge network, and means responsive to said unbalance for continuously controlling said reversible electrical motor.

4. Photometric measuring apparatus including the combination of a light sensitive device responsive to change in magnitude of a variable condition, a second light sensitive device, an electric lamp arranged to illuminate said second light sensitive device, lamp energizing means, means under control of said first mentioned light sensitive device adapted to control said energizing means so that the elimination of said second mentioned light sensitive device is definitely related to that of the first mentioned light sensitive device, a Wheatstone bridge network including said second mentioned means and said lamp in one arm thereof connected in circuit with said energizing means and adapted to be unbalanced in accordance with the sense and extent of the change in said energizing means, a slidewire resistor connected in another arm of said bridge network adapted to be adjusted to rebalance said bridge network, a reversible electrical motor adapted to adjust said slidewire resistor, and means responsive to said unbalance for continuously controlling said reversible electrical motor.

5. Photometric measuring apparatus including the combination of a light sensitive device responsive to change in magnitude of a variable condition, a second light sensitive device, an electric lamp arranged to illuminate said second light sensitive device, lamp energizing means, electronic means under control of said first mentioned light sensitive device adapted to control said lamp energizing means so that the illumination of said second mentioned light sensitive device is definitely related to that of the first mentioned light sensitive device, a Wheatstone bridge network including said electronic means and said lamp in one arm thereof connected in circuit with said energizing means and adapted to be unbalanced in accordance with the sense and extent of the change in said energizing means, a slidewire resistor connected in another arm of said bridge network, a reversible electrical motor adapted to adjust said resistor to rebalance said bridge network, and means responsive to said unbalance for continuously controlling said reversible electrical motor.

6. Photometric measuring apparatus including the combination of a light sensitive device responsive to change in magnitude of a variable condition, a second light sensitive device, an electric lamp arranged to illuminate said second light sensitive device, lamp energizing means, electronic means under control of said first mentioned light sensitive device adapted to control said lamp energizing means so that the illumination of said second mentioned light sensitive device is definitely related to that of the first mentioned light sensitive device, a Wheatstone bridge network including said lamp in one arm thereof and connected in circuit with said energizing means adapted to be unbalanced in accordance with the sense and extent of the change in said energizing means, a slidewire resistor connected in another arm of said bridge network adapted to be adjusted to rebalance said bridge network, a reversible electrical motor adapted to adjust said resistor, and means responsive to said unbalance for continuously controlling said reversible electrical motor.

7. Photometric measuring apparatus including the combination of a light sensitive device responsive to change in magnitude of a variable condition, a second light sensitive device, an electric lamp arranged to illuminate said second light sensitive device, a source of alternating current, an electronic valve under control of said first mentioned light sensitive device connected in circuit with said lamp and said alternating current source and adapted to control the flow of current to said lamp so that the illumination of said second mentioned light sensitive device is definitely related to that of the first mentioned light sensitive device, a Wheatstone bridge network including said lamp in one arm thereof and connected in circuit with said alternating current source adapted to be unbalanced in accordance with the sense and extent of the change in lamp energizing current, a slidewire resistor connected in another arm of said bridge network and adapted to be adjusted to reduce said bridge unbalance, a reversible electrical motor adapted to adjust said slidewire resistor, and means responsive to said unbalance for continuously controlling said reversible electrical motor.

8. Photometric measuring apparatus including the combination of a light sensitive device responsive to change in magnitude of a variable condition, a second light sensitive device, an electric lamp arranged to illuminate said second mentioned light sensitive device, a direct current voltage source, a self-balancing Wheatstone bridge network having its energizing terminals connected in circuit with said lamp and said direct current voltage source and adapted to be unbalanced in accordance with changes in the energizing current supplied thereto, a source of alternating voltage connected across said bridge network energizing terminals for causing the appearance of an unbalanced alternating voltage across the equalizing terminals of said bridge network upon unbalance of the latter, electronic valve means under control of said first mentioned light sensitive device adapted to control the flow of direct current to said lamp and to said bridge for changing the energization of said lamp so that the illumination of said second mentioned light sensitive device is definitely related to that of the first mentioned light sensitive device, a slidewire resistor connected in another arm of said bridge network adapted to be adjusted to reduce said bridge unbalance, a reversible electrical motor adapted to adjust said slidewire resistor, and means responsive to said unbalanced alternating voltage for continuously controlling said reversible electrical motor.

9. Photometric measuring apparatus including the combination of a light sensitive device responsive to change in magnitude of a variable condition, a second light sensitive device, an electric lamp arranged to illuminate said second mentioned light sensitive device, a direct current voltage source, a Wheatstone bridge network including lamps in opposite arms and having its energizing terminals connected in circuit with said direct current voltage source adapted to be unbalanced in accordance with changes in the energizing current supplied thereto, a source of alternating current connected across said bridge network energizing terminals for causing the appearance of an unbalanced alternating voltage across the equalizing terminals of said bridge network upon unbalance of the latter, electronic valve means under control of said first mentioned light sensitive device adapted to control the flow of direct current to said electric lamp and to said bridge for changing the energization of said electric lamp so that the illumination of said second mentioned light sensitive device is definitely related to that of the first mentioned light sensitive device, a slidewire resistor connected in a third arm of said bridge network adapted to be adjusted to reduce said bridge network unbalance, a reversible electrical motor adapted to adjust said slidewire resistor, and means responsive to said unbalance alternating voltage for continuously controlling said reversible electrical motor.

10. Photometric measuring apparatus including the combination of a light sensitive device responsive to change in magnitude of a variable condition, a second light sensitive device, an electric lamp arranged to illuminate said second mentioned light sensitive device, a direct current voltage source, a Wheatstone bridge network including said lamp in one arm thereof and having its energizing terminals connected in circuit with said direct current voltage source and adapted to be unbalanced in accordance with changes in said direct current voltage, electronic valve means under control of said first mentioned light sensitive device adapted to control the flow of direct current to said bridge for changing the energization of said lamp so that the illumination of said second mentioned light sensitive device is definitely related to that of the first mentioned light sensitive device, means for translating the bridge direct current unbalanced voltage into an alternating voltage whose phase and magnitude are determined by the polarity and magnitude of said direct current unbalanced voltage, a slidewire resistor connected in another arm of said bridge network adapted to be adjusted to reduce said direct current unbalanced voltage, a reversible electrical motor adapted to adjust said slidewire resistor, and means responsive to said alternating voltage for continuously controlling said reversible electrical motor.

11. Measuring apparatus including the combination of an electrical circuit, means responsive to change in a variable condition to produce a unidirectional electric current flow in said circuit, the magnitude of said current varying in accordance with the magnitude of said condition, means including a normally balanced bridge circuit under control of said current in substantially unmodified form to produce an alternating voltage of one phase or of opposite phase on deviation in one direction or the other of said current from a predetermined value, a device included in said bridge circuit and adapted to be adjusted to reduce said alternating voltage substantially to zero, and a phase responsive device under control of said alternating voltage to adjust said first mentioned device in one sense or in an opposite sense depending upon the phase of said alternating voltage.

12. Photometric measuring apparatus including the combination of a light sensitive device responsive to change in magnitude of a variable condition, a second light sensitive device, means for illuminating said second light sensitive device so that its illumination is definitely related to that of the first mentioned light sensitive device, means responsive to changes in the electrical energy used by the first mentioned means, said last mentioned means including a balanced electrical network conductively connected to said first mentioned means and in which unbalanced electromotive forces are adapted to be produced upon change in the energy used by the first mentioned means, a device adapted to rebalance said network on unbalance thereof, electrical valve means having an input circuit and an output circuit electrically controlled by said input circuit to control said device, operative connections between the output circuit of said electrical valve means and said device, and operative connections to directly control the input circuit of said electrical valve means by said unbalanced electromotive forces.

13. Measuring apparatus including the combination of an electrical bridge network the impedance of one arm of which is responsive to change in magnitude of a variable condition for unbalancing said bridge, means including a current conductor for varying the impedance of a second arm of said bridge so that its impedance is definitely related to that of the first mentioned arm including energy controlling means responsive to bridge unbalance, said last mentioned means including a balanced electrical network conductively connected to said current conductor of said first mentioned means and in which unbalanced electromotive forces are adapted to be produced in accordance with the sense and extent of change in impedance of the second mentioned arm of said bridge, a device adapted to effect rebalance of said second mentioned electrical network, electrical valve means having an input circuit and an output circuit electrically controlled by said input circuit to control said device, operative connections between the output circuit of said electrical valve means and said device, and operative connections to directly control the input circuit of said electrical valve means by said unbalanced electromotive forces.

14. Measuring apparatus including the combination of an electrical bridge network the resistance of one arm of which is responsive to change in magnitude of a variable condition for unbalancing said bridge, means including a current conductor for varying the resistance of a second arm of said bridge so that its resistance is definitely related to that of the first mentioned arm including energy controlling means responsive to bridge unbalance, said last mentioned means including a Wheatstone bridge network conductively connected to said current conductor of said first mentioned means and in which unbalanced electromotive forces are adapted to be produced in accordance with the sense and extent of change in resistance of the second mentioned arm of said first mentioned bridge network, a reversible electrical motor adapted to effect rebalance of said Wheatstone bridge network, electrical valve means having an input circuit and an output circuit electrically controlled by said input circuit to control said motor, operative connections between the output circuit of said electrical valve means and said motor, and operative connections to directly control the input circuit of said electrical valve means by said unbalanced electromotive forces.

15. Measuring apparatus including the combination of an electrical bridge network adapted to have an unbalanced potential produced therein in accordance with the change in magnitude of a variable condition, means for measuring said unbalanced potential including means for producing a second electrical potential variable in accordance with said bridge unbalanced potential, a second electrical bridge network conductively connected to said second mentioned means to measure said second electrical potential and in which unbalanced electromotive forces are adapted to be produced in accordance with the sense and extent of the change in said second electrical potential, a device adapted to rebalance said second mentioned bridge network, electrical valve means having an input circuit and an output circuit electrically controlled by said input circuit to control said device, operative connections between the output circuit of said electrical valve means and said device, and operative connections to directly control the input circuit of said electrical valve means by said unbalanced electromotive forces.

16. Measuring apparatus including the combination of an electrical device responsive to change in magnitude of a variable condition, a second electrical device, means for electrically energizing said second device so that its electrical energization is definitely related to the electrical energization of the first mentioned device, means responsive to the electrical energy used by the first mentioned means, said last mentioned means including a balanced electrical network conductively connected to said first mentioned means and in which unbalanced electromotive forces are adapted to be produced in accordance with the sense and extent of the change of the energization of the said second mentioned device, a third device adapted to effect rebalance of said network, electrical valve means having an input circuit and an output circuit electrically controlled by the input circuit to control said third mentioned device, operative connections between the output circuit of said electrical valve means and said third mentioned device, and operative connections to directly control the input circuit of said electrical valve means by said unbalanced electromotive forces.

17. Measuring apparatus including the combination of an electrical device adapted to produce an electrical effect responsive to change of magnitude of a variable condition, means for producing an electrical effect variable in accordance with the first mentioned electrical effect and definitely related thereto, means responsive to changes in the electrical energy producing said second electrical effect, said last mentioned means including a balanced electrical network conductively connected to said first mentioned means and in which unbalanced electromotive forces are adapted to be produced in accordance with the sense and extent of the change in said second effect, a second device adapted to effect rebalance of said network, electrical valve means having an input circuit and an output circuit electrically controlled by the input circuit, operative connections between the output circuit of said electrical valve means and said second mentioned device, and operative connections to directly control the input circuit of said electrical valve means by said unbalanced electromotive forces.

18. Measuring apparatus including the combination of a Wheatstone bridge network adapted to have an unbalanced potential produced therein in accordance with the change in magnitude of a variable condition, means for measuring said unbalanced potential including means for producing a unidirectional electrical current variable in accordance with bridge unbalance and a second Wheatstone bridge network conductively connected to said second mentioned means to measure said unidirectional current and in which unbalanced electromotive forces are adapted to be produced in accordance with the sense and extent of the change in said unidirectional current, a reversible electrical motor to rebalance said second mentioned bridge network, electrical valve means having an input circuit and an output circuit electrically controlled by said input circuit to control said motor, operative connections between the output circuit of said electrical valve means and said motor, and operative connections to directly control the input circuit of said electrical valve means by said unbalanced electromotive forces.

19. Photometric measuring apparatus comprising the combination with a normally balanced electrical network of a light sensitive device responsive to changes in a variable condition for producing unbalanced electromotive forces in said electrical network, a device adapted to reduce said unbalanced electromotive forces, electrical valve means having an input circuit and an output circuit electrically controlled by said input circuit for continuously controlling the actuation of said last mentioned device in accordance with the magnitude of said condition, operative connections between the output circuit of said electrical valve means and said last mentioned device, and operative connections to directly control the input circuit of said electrical valve means by said unbalanced electromotive forces.

20. Photometric measuring apparatus comprising the combination with a balanced electrical network of a light sensitive device responsive to change in magnitude of a variable condition for unbalancing said electrical network to an extent corresponding with said change, a device adapted to effect rebalance of said network upon unbalance thereof, electrical valve means having an input circuit and an output circuit electrically controlled by said input circuit for continuously controlling the actuation of said last mentioned device in accordance with the magnitude of said condition, operative connections between the output circuit of said electrical valve means and said last mentioned device, and operative connections to directly control the input circuit of said electrical valve means in accordance with the state of balance of said electrical network.

21. Photometric measuring apparatus comprising the combination with a balanced electrical network of a light sensitive device responsive to change in magnitude of a variable condition for producing unbalanced electromotive forces in said electrical network of magnitude corresponding with said change, an impedance in said network adapted to be adjusted to reduce said unbalanced electromotive forces, a reversible electrical motor adapted to adjust said impedance, electrical valve means having an input circuit and an output circuit electrically controlled by said input circuit for continuously controlling said motor to reduce said unbalanced electromotive forces substantially to zero, operative connections between the output circuit of said electrical valve means and said motor, and operative connections to directly control the input circuit of said electrical valve means by said unbalanced electromotive forces.

22. Measuring apparatus including the combination of a Wheatstone bridge network adapted to be unbalanced in accordance with the change of magnitude of a variable condition, means for measuring said unbalance including means for producing a pulsating electrical current variable in accordance with bridge unbalance and a second Wheatstone bridge network conductively connected to said second mentioned means to measure said pulsating electrical current and in which unbalanced electromotive forces are adapted to be produced in accordance with the sense and extent of the change in said current, a reversible electrical motor to rebalance said second mentioned bridge network, electrical valve means having an input circuit and an output circuit electrically controlled by the input circuit, operative connections between the output circuit of said electrical valve means and said motor, and operative connections to directly control the input circuit of said electrical valve means by said unbalanced electromotive forces.

THOMAS R. HARRISON.